United States Patent [19]

Ogawa

[11] Patent Number: 4,843,499
[45] Date of Patent: Jun. 27, 1989

[54] TAPE WINDING DIRECTION SWITCH DEVICE OF CASSETTE TAPE RECORDER

[75] Inventor: Hisashi Ogawa, Tokyo, Japan
[73] Assignee: Shinwa Kabushiki Kaisha, Tokyo, Japan
[21] Appl. No.: 100,025
[22] Filed: Sep. 23, 1987
[30] Foreign Application Priority Data Oct. 3, 1986 [JP] Japan ................. 61-235768

[51] Int. Cl.$^4$ ........................... G11B 15/10
[52] U.S. Cl. ................................. 360/96.3
[58] Field of Search ............ 360/137, 96.3, 93, 96.1, 360/96.2, 96.4

[56] References Cited

U.S. PATENT DOCUMENTS

| | | | |
|---|---|---|---|
| 4,430,680 | 2/1984 | Yamaguchi et al. | 360/137 |
| 4,581,665 | 4/1986 | Ito et al. | 360/137 |
| 4,564,873 | 1/1986 | Hashimoto et al. | 360/96.3 |
| 4,623,946 | 11/1986 | Ida | 360/96.3 |

FOREIGN PATENT DOCUMENTS 55-67964  5/1980  Japan .................. 360/137

Primary Examiner—John H. Wolff
Assistant Examiner—Matthew J. Bussan
Attorney, Agent, or Firm—James E. Nilles; Donald C. McGaughey

[57] ABSTRACT

A tape winding direction switch device of a cassette tape recorder wherein a switching operation member which is operated in accordance with a fast forward lever and a fast rewinding lever is provided so as to operate a gear engagement clutch plate which selectively rotates a pair of reel mountings, a tape winding direction switching plate is connected elastically through a switching rotary nember to the switching operation member, and the fast forward lever and the fast rewinding lever are operated without any concern with the tape winding direction switching plate.

8 Claims, 2 Drawing Sheets

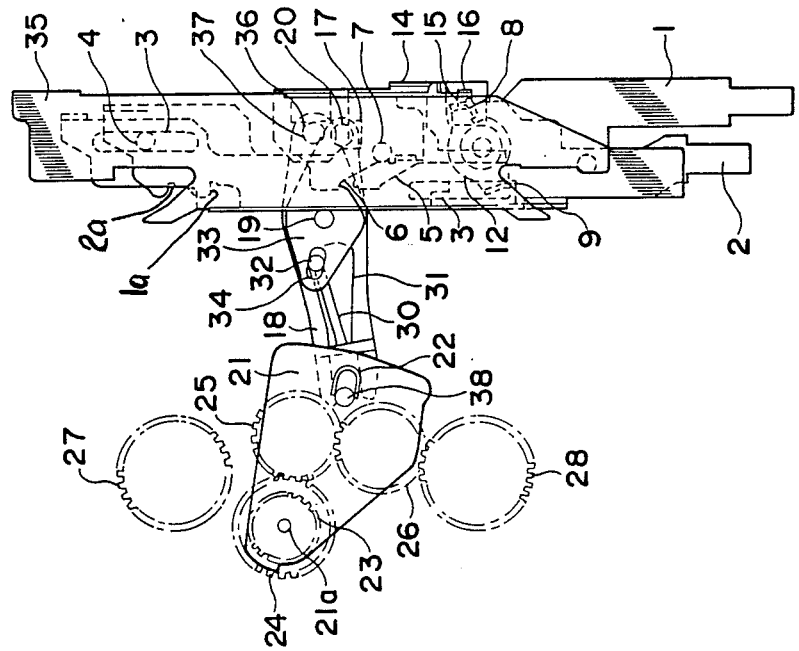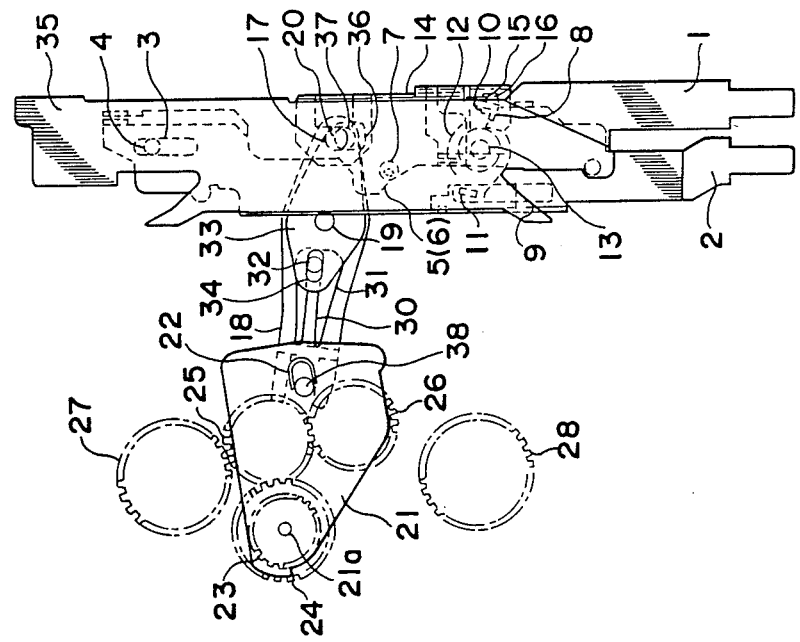

TAPE WINDING DIRECTION SWITCH DEVICE OF CASSETTE TAPE RECORDER

BACKGROUND OF THE INVENTION

1. Field of the Invention

This invention relates to a tape winding direction switch device of a cassette tape recorder, and relates to a tape fast forward mechanism of an autoreverse type tape recorder.

2. Description of the Prior Art

A tape recorder in which a tape is fast forwarded by operation of a gear engagement clutch plate which selectively rotates a pair of reel mountings characterized by a device in which a fast forward lever or a fast rewinding lever is operated at the time of forwarding the tape or reverse playbacking so as to shift the tape in the reverse direction and as well to switch a playback channel of a head for the purpose of obtaining an output from a channel individual from the channel for playback has been proposed (Japanese Patent Application No. 230410/1985).

Such a tape recorder raises a problem as that a head delivers an output from a different channel from the channel of a tape which has been playbacked by switching, as a result of which the end of a record, that is a signal for music search cannot be taken out because the tape winding clutch plate which is operated in accordance with detection of the end of tape winding is operated to switch a direction of rotation of the reel mounting when fast rewinding is carried out in the tape forward mode or reverse mode.

SUMMARY OF THE INVENTION

An object of the present invention is to overcome the above problem and to provide a tape winding direction switch device of a tape recorder of a type in which tape running direction can be reversed without any concern to a tape winding direction clutch plate which is operated in accordance with the end of winding of the tape for the purpose of preventing the output channel of the head from being switched when the tape is fast reversed at the time of playbacking in both forward or reverse direction.

A tape winding direction switch device of a tape recorder according to the present invention in which a tape is fast forwarded by a gear engagement clutch plate which selectively rotates a pair of reel mountings comprises a fast forward lever, fast rewinding lever, a switching operation member which is operated in accordance with the operation of the aforesaid levers, and which operates the aforesaid gear engagement clutch plate, a tape winding direction switching plate a switching rotary member which elastically synchronizes with the tape winding direction clutch plate and the aforementioned switching operation member. The aforementioned fast forward lever and the fast rewinding lever are, thus, adapted to be operated without any concern to the aforementioned tape winding direction switching plate.

The tape winding direction switch device of a cassette tape recorder according to the present invention is characterized by that:

when the tape is wound fully during a playback operation, the tape winding direction switching plate is operated in accordance with the detection of the full winding up, and the switching rotary member and the switching operation member are elastically connected so as to operate the gear engagement clutch plate for the purpose of switching the direction of rotation of the reel mounting into the reverse direction, and playback is thus carried out because the tape playback channel of the tape is switched. Further, head output channel is not changed because the tape winding direction switching plate is not operated when the fast forward lever or the fast rewinding lever is operated during playback, the switching rotary member operates the gear engagement clutch plate without any concern to the tape winding direction switching plate to switch the direction of rotation of the reel mounting into the reverse direction for the purpose of carrying out fast forward.

Further object and characteristics of the present invention will be made clear with reference to the following drawings.

BRIEF DESCRIPTION OF THE DRAWINGS

FIGS. 1 to 4 are plan views illustrating the function of a tape winding direction switch device of a cassette tape recorder according to the present invention.

PREFERRED EMBODIMENTS OF THE INVENTION

Figure 4:
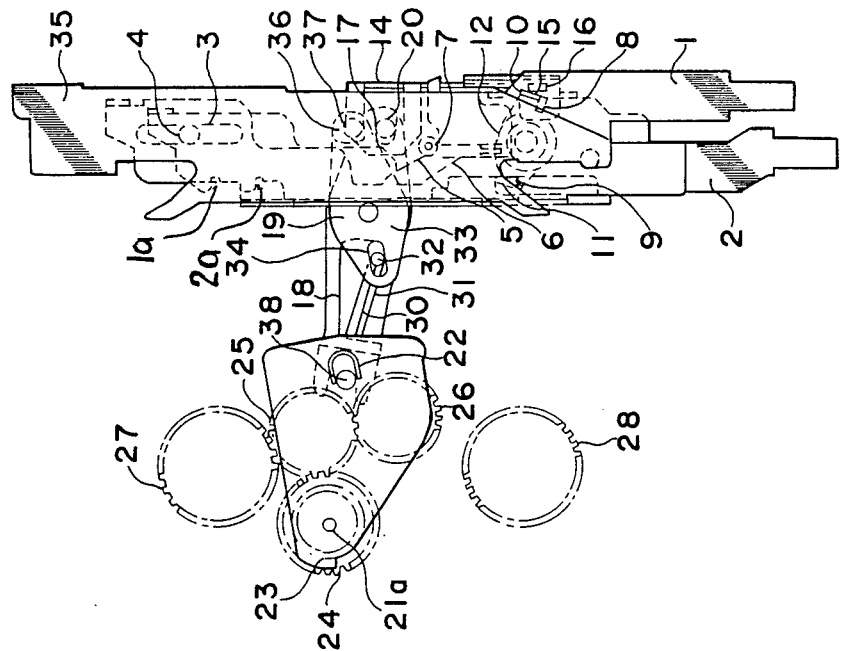

Reference numeral 1 represents a fast forward lever, and reference numeral 2 represents a fast rewinding lever. These levers 1 and 2 are provided in a laminated manner and in the manner which is longitudinally freely movable in a frame of the device which is omitted from illustration. A guide pin 4 which is projectingly provided from the frame of the device is provided in guide elongated holes 3 which are formed in the longitudinal direction, that is, in the moving direction of the levers 1 and 2.

Cam edges 5 and 6 are respectively provided on each side of the aforesaid levers 1 and 2. An operation pin 7 faced to theses cam edges 5 and 6 is projectingly provided on the head base plate (not shown). This head base plate is forced by a spring which is omitted from illustration toward such a direction in which a head and a pinch roller are engaged to the cam edges of the aforementioned levers 1 and 2, that is the direction in which they are forced to the recording and playback position of the tape surface. This shift of two levers 1 and 2 toward rear position causes the operation pin 7 which is faced to the cam edges 5 and 6 to be pressed in such a manner that the head and the pinch roller on the head base plate slightly moves sideward.

Engaging projections 8 and 9 are respectively formed in the shape of a tab on the aforesaid fast forward lever 1 and the fast rewinding lever 2. A switching rotary member 12 having portions 10 and 11 which are adapted to be engaged by the aforementioned engaging projections 8 and 9, and which are provided on two sides thereof is rotatably secured into the frame of the device by means of a shaft 13. The reverse movement of two levers 1 and 2 causes for the engaging projections 8 and 9 to be engaged to the portions 10 and 11 for the purpose of being rotated in the opposite direction each other. The levers 1 and 2 have locking portions 1a and 2a, respectively, shown in FIGS. 2 and 4. As shown, when each of the levers 1 and 2 is shifted to a rear position, it is locked therein by its associated locking portion 1a or 2a with the lock of one lever being unlocked by pushing the other lever.

Reference numeral 14 represents a moving operation member which is provided in the free movable manner in the frame of the device in the same direction as that of the aforesaid fast forward lever 1 and the fast rewinding lever 2. An engaging hole 16 which is adapted to be engaged to an engaging member 15 of the aforesaid switching rotary member 12 is formed in this moving operation member 14. An operation hole 17 is further formed in this moving operation member 14.

Reference numeral 18 represents a switching operation member which is rotatably secured to the frame of the device by means of a shaft 19. A pin 20 is engaged in the operation hole 17 in the aforesaid moving operation member. Then pin 20 is mounted at one end of the switching operation member 18 and together with hole 17 constitutes a first engaging means. An engaging recess 22, constituting a second engaging means, which is adapted to be engaged to a pin 38 which is projectingly provided on a gear engagement clutch plate 21, is formed at the other end of this switching operation member 18. This gear engagement clutch plate 21 is rotatably secured by a shaft 21a which is provided for the frame of the device, and gears 23 and 24 are rotatably secured to this shaft 21a. A forward rotation gear 25 which is adapted to be engaged with one of the gears 24 and a reverse rotation gear 26 which is adapted to be engaged with this forward rotation gear 25 are respectively rotatably journaled. This forward rotation gear 25 is detachably engaged with one of reel gears 27 which rotates one side reel mountings by way of rotation (counterclockwise direction shown in FIG. 1) of the gear engagement clutch plate 21. And the reverse rotation gear 26 is detachably engaged with the other reel gear 28 which rotates the other side reel mounting.

The other gear 23 which is rotatably secured to the shaft 21a for holding the aforesaid gear engagement clutch plate 21 is engaged with an output gear which is adapted to be rotated by an electric motor.

An elastic operation member 30 is provided for the aforesaid switching operation member 18 in the manner projecting into a space 31 from the other side of the switching operation member 18 toward the shaft 19 of the switching operation member 18. A pin 32 which is projectingly provided at the tip of this elastic operation member 30 is engaged to an elongated hole 34 in a switching rotary member 33 which is journaled to the shaft 19 which is provided with the aforesaid switching operation member 18. The pin 32 on the end of elastic member 30 and the hole 34 comprises a second connecting means for elastically engaging switching operation member 18.

Reference numeral 35 represents a tape winding direction switching plate which is provided for the frame of the device in a movably free manner in the same direction as that of the aforementioned fast forward lever 1 and the fast rewinding lever 2, and which is operated in accordance with the detection operation of the tape winding end by a tape winding finish detecting means which is omitted from illustration. The operation of the tape winding direction switching plate 35 causes for the playback channel of the tape to be switched. A pin 37 which is projectingly provided on the aforesaid switching rotary member 33 is engaged into an engaging hole 36 which is formed in the tape winding direction switching plate 35. The pin 37 and hole 36 comprise a first connecting means for connecting the switching rotary member 33 to switching plate 35.

The operation of the device according to the present invention will now be described.

In a case where a tape in a cassette is playbacked by winding forward, as shown in FIG. 1, the tape winding direction switching plate 35 is forced forward, and the switching rotary member 33 which is engaged to the engaging hole 36 in this tape winding direction switching plate 35 by means of the pin 37 is rotated with respect to the shaft 19 (in the clockwise direction shown in FIG. 1). And the fast forward lever 1 and the fast rewinding lever 2 are positioned forward, as a result of which the moving operation member 14 is also positioned forward. Because of the aforementioned reason, the head and the pinch roller are put forward to the tape surface, and the switching operation member 18 is also rotated in the same direction as that of the switching rotary member 33. The gear engagement clutch plate 21 in which the pin 38 is engaged to the other end of the engaging recess 22 of the switching operation member 18 is rotated with respect to the shaft 21a, the forward rotation gear 25 is engaged with the reel gear 27 of one of the reel mountings, and this reel gear 27 is rotated by means of the electric motor in the direction in which the tape is wound by the reel mounting.

Figure 3:
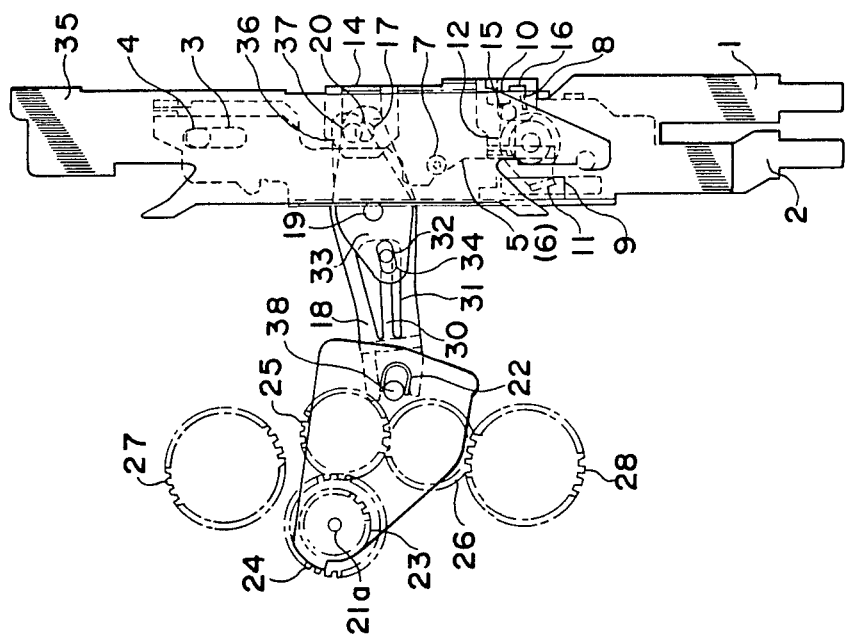

When the tape is wound up to one of the reel mountings, as shown in FIG. 3; the tape winding direction switching plate 35 is moved rearward in accordance with detection of the tape winding finish, the head is moved in accordance with the movement of this tape winding direction switching plate 35 for the purpose of switching the playback channel.

The switching rotary member 33 is rotated by means of a pin 37 which is engaged into the engaging hole 36 (in the counterclockwise direction shown in FIG. 1). The elastic operation member 30 whose pin 32 is engaged into the elongated hole 34 rotates the operation member 18 in the same direction. And the gear engagement clutch plate 21 whose pin 38 in engaged into the engaging recess 22 in this switching operation member 18 is rotated (in the clockwise direction shown in FIG. 1). The reverse rotation gear 26 is engaged with the reel gear 28 of the other reel mounting, and this gear 28 is rotated in the direction in which the tape is wound to the other reel mounting for the purpose of playback the tape in the reverse direction. When the tape is wound up in this state, the tape winding direction switching plate 35 is moved forward again in accordance with the detection of the tape winding, and is brought into the state shown in FIG. 1, that is, the tape is wound by one of the reel mountings by rotation of the reel gear 27 of one of the reel mountings again for the purpose of playbacking the tape in the forward direciton.

When the fast rewinding lever 2 is pressed rearward at the time of playbacking in the forward direction, as shown in FIG. 1, the rearward movement of this fast rewinding lever 2 causes for the cam edge 6 to press the operation pin 7, and the head and the pinch roller are slightly moved rearward from the tape surface and are kept at the position at which the end of the recording unit of the tape can be detected. And the rotary member 12 whose portion 11 is engaged to the engaging projection 9 of this fast rewinding lever 2 is rotated (in the counterclockwise direction shown in FIG. 1). The moving operation member 14 of which engaging hole 16 engages the engaging member 15 of this rotary member 12 is moved rearward. The switching operation member 18 of which pin 20 is engaged into the operation hole 17 in this movement operation member 14 is rotated (in the counterclockwise direction shown in FIG. 1). The forward rotation gear 25 is released from engagement with one of the reel gears 27, and the reverse rotation gear 26 is brought into engagement with the other reel gear 28 on the other reel for the purpose of fast rewinding the tape in the direction in which the tape is wound by the other reel mounting. And return of the fast rewinding lever 2 causes for the head and pinch roller to be brought into the tape surface by means of the cam edge 6, as a result of which, the forward playback is carried out, as shown in FIG. 1.

When the fast forward lever 1 is pressed rearward at the time of playbacking in the reverse direction, as shown in FIG. 3, the movement of this fast forward lever 1 causes for the cam edge 5 to press the operation pin 7, as a result of which, the head and the pinch roller are slightly moved rearward from the tape surface in the cassette recorder to the position at which the recording end of the unit of the recording of the tape can be detected. And the rotary member whose portion 10 is engaged to the engaging projection 8 of the fast forward lever 1 is rotated (in the clockwise direction shown in FIG. 1). This rotation causes the sliding operation member 14 whose engaging hole 16 engages the engaging member 15 of this rotary member 12 is moved rearward. The switching operation member 18 whose pin 20 is engaged into the operation hole 17 in this moving operation member 14 is rotated (in the clockwise direction shown in FIG. 1). As a result of this, the reverse rotation gear 26 is released from engagement with the reel gear 28, and the forward rotation gear 25 is brought into engagement with the reel gear 27 of one of the reel mountings, and the tape is fast forwarded in the direction in which the tape is wound by one of the reel mountings. The return of the fast forward lever 1 causes for the head and the pinch roller brought into the tape surface by means of the cam edge 5, as a result of which, the reverse direction playback is carried out, as shown in FIG. 3.

When the fast forward lever 1 is pressed rearward at the time of forward playback shown in FIG. 1, the rearward movement of this fast forward lever 1 causes for the cam edge 6 to press the operation pin 7, as a result of which, the head and the pinch roller are slightly moved rearward from the tape surface in the cassette player without any rotation of the rotary member 12 and without any rearward movement of the moving operation member 14. As a result of this, the tape is fast forwarded in the direction in which the tape is wound by one of the reel mountings with the forward rotation gear 25 which is kept with the reel gear 27 of the reel mountings.

When the fast rewinding lever 2 is pressed rearward at the time of reverse playbacking, as shown in FIG. 3, the tape is fast forwarded in the direction of being wound by the other reel mounting with the reverse rotation gear 26 kept in engagement with the other reel gear 28 in the similar manner to the above.

In the case where the tape is fast rewound at the time of forward or reverse playbacking, the tape winding direction switching plate 35 is not operated, the tape channel, therefore, is not changed. Therefore, when the tape is rewound to playback by detection of the end of the recording, the recording end which is same in the channel as that before fast rewinding can be detected.

According to the present invention, by operation of the fast forward lever or the fast rewinding lever at the time of playbacking in which the tape is fed forward or rearward, the tape running direction can be switched by way of operation of the same gear engagement clutch plate without any concern with tape direction switching by way of detection of the end of the tape winding. Further the tape direction can be switched without any concern with the switching of the tape winding direction by way of the detection of the tape winding end, as a result of which, the head output channel is not switched. It will contribute to the carrying out the end of the recording unit of the tape which has been playbacked, that is, program search can be carried out securely.

I claim:

1. A tape winding direction switch device for a cassette tape recorder of the type having a pair of rotatable tape reel mounting members and a gear engagement clutch plate (21) mounted thereon for movement in opposite directions for selectively engaging gear driving means to rotate either one or the other of said reel mounting members in fast forward or fast rewind directions, said switch device comprising:
    a frame;
    a fast forward lever (1) mounted on said frame for movement to a fast forward position;
    a fast rewind lever (2) mounted on said frame for movement to a fast rewind position;
    a switching operation member (18) mounted on said frame for reciprocal movement and having a pair of ends, a first engaging means (17, 20) connecting one of said ends to said fast forward and fast rewind levers and a second engaging means (22) connecting said other end to said clutch plate (21);
    a tape winding direction switch plate (35) mounted on said frame for movement between forward and reverse playback channel positions; and
    a switching rotary member (33) mounted on said frame for movement relative thereto and having a first connection means (36, 37) for engaging said switching plate (35) and a second connection means (32, 34) for elastically engaging said switching operating member (18);
whereby said fast forward and rewind levers can be alternately moved to their respective fast forward and rewind positions to reciprocate said switching operation member (18) and move said clutch plate (21) in opposite directions without moving said rotating member (33) and said tape direction switch plate (35) connected thereto.

2. A tape winding direction switch device for a cassette tape recorder according to claim 1 wherein, said switching operation member (18) and said switching rotary member (33) are mounted on said frame for rotation about a single common pivot (19).

3. A tape winding direction switch device according to claim 1 wherein
    said first connection means includes an engaging hole (36) in said switch plate (35) and a pin (37) mounted on said switching rotary member for engagement in said hole; and
    said second connection means includes an elongated hole (34) in said switching rotary member and a pin (32) mounted on said switching operation member (18).

4. A tape winding direction switch device according to claim 3 wherein, said switching operation member (18) has an elastic operation member (30) mounted thereon, and wherein said pin (32) is mounted on said elastic operation member.

5. A tape winding direction switch according to claim 1 wherein, said first engaging means (17, 20) comprises:
- a switching rotary member (12) mounted on said frame for rotational movement and having a securing member (15);
- a moving operation member (14) mounted on said frame for movement relative thereto and having an operation hole (17) and an engaging hole (16) secured to said securing member; and
- a pin (20) mounted on said one end of said switching operation member and mounted in said operation hole (17).

6. The tape winding direction switch device according to claim 1 wherein, said switching rotary member (33) has, at one end thereof, a pin (37) which is adapted to be engaged to an engaging hole (36) formed in said tape winding direction switching plate (35) and having at the other end thereof, an elongated hole (34) which is adapted to be engaged to a pin (32) projectingly provided at the top end of an elastic operation member (30) extending from said switching operation member (18).

7. The tape winding direction switch device according to claim 1 further comprising a switching rotary member (12) and a moving operation member (14) having an engaging hole (16) which is adapted to be engaged to a securing member (15) of said switching rotary member (12) and having an operation hole (17) which is adapted to be engaged to a pin (20) formed at one end of said switching operation member (18).

8. A tape winding direction switch device of a cassette tape recorder in which a tape is fast forwarded by way of operation of a gear engagement clutch plate (21) which selectively rotates a pair of reel mounting comprising:
- a fast forward lever (1);
- a fast rewinding lever (2);
- a switching operation member (18) which is rotated in opposite directions when said two levers (1) and (2) are pushed, respectively, and which operates said gear engagement clutch plate (21) in opposite directions, respectively;
- a tape winding direction switching plate (35); and
- a switching rotary member (33) which elastically connects in a synchronized manner between said tape winding direction switching plate (35) and said switching operation member (18) for operating said gear engagement clutch plate (21), said gear engagement clutch plate (21) being moved in opposite directions when said switching operation member (18) is rotated, irrespective of the moving direction of the switching rotary member (33) connected to the tape winding direction switching plate (35), by said fast forward lever (1) and said fast rewinding lever (2).

* * * * *